US007967090B2

(12) United States Patent
Atarashi et al.

(10) Patent No.: US 7,967,090 B2
(45) Date of Patent: Jun. 28, 2011

(54) HYBRID DRIVE UNIT AND RUNNING CONTROL METHOD FOR HYBRID DRIVE UNIT

(75) Inventors: Tomoo Atarashi, Kariya (JP); Shigeki Takami, Anjo (JP); Nobukazu Ike, Kariya (JP); Yuji Iwase, Mishima (JP); Atsushi Tabata, Okazaki (JP); Tooru Matsubara, Toyota (JP); Hiroyuki Shibata, Susano (JP); Tatsuya Imamura, Okazaki (JP); Takuma Kakinami, Toyota (JP); Kenta Kumazaki, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 316 days.

(21) Appl. No.: 12/000,518

(22) Filed: Dec. 13, 2007

(65) Prior Publication Data

US 2008/0314658 A1    Dec. 25, 2008

(30) Foreign Application Priority Data

Dec. 27, 2006 (JP) .................... 2006-353073

(51) Int. Cl.
*B60W 20/00* (2006.01)
*B60W 10/08* (2006.01)

(52) U.S. Cl. ........... 180/65.21; 180/65.275; 180/65.285; 180/65.6; 180/65.7; 903/903; 903/915; 903/930

(58) Field of Classification Search ............... 180/65.1, 180/65.21, 65.275, 65.285, 65.6, 65.7; 903/903, 903/909, 915, 917, 918, 919, 930
See application file for complete search history.

(56) References Cited

U.S. PATENT DOCUMENTS

| 4,652,801 A * | 3/1987 | Burdett ................... 318/481 |
| 2006/0076840 A1* | 4/2006 | Yamaguchi et al. ............ 310/53 |
| 2006/0231314 A1* | 10/2006 | Homan et al. ................. 180/233 |

FOREIGN PATENT DOCUMENTS

| JP | A-6-327104 | 11/1994 |
| JP | A 09-289701 | 11/1997 |
| JP | A 11-055810 | 2/1999 |
| JP | A 2001-177909 | 6/2001 |
| JP | A 2003-304604 | 10/2003 |
| JP | 2006046576 A * | 2/2006 |
| JP | A-2006-46576 | 2/2006 |

\* cited by examiner

*Primary Examiner* — Hau V Phan
*Assistant Examiner* — Bryan A Evans
(74) *Attorney, Agent, or Firm* — Oliff & Berridge, PLC

(57) ABSTRACT

A hybrid drive system includes an engine; at least one rotating electric machine, wherein the engine and the at least one rotating electric machine are capable of driving a vehicle; and a controller. The controller starts a load limit control that limits a load exerted to the rotating electric machine when a temperature of the rotating electric machine exceeds a load limit start temperature; detects a loading state or a towing state of the vehicle; and determines the load limit start temperature based on the loading state or the towing state detected.

23 Claims, 13 Drawing Sheets

HYBRID DRIVE UNIT AND RUNNING CONTROL METHOD FOR HYBRID DRIVE UNIT

INCORPORATION BY REFERENCE

The disclosure of Japanese Patent Application No. 2006-353073 filed on Dec. 27, 2006 including the specification, drawings and abstract is incorporated herein by reference in its entirety.

BACKGROUND

The present invention relates to a hybrid drive system and a drive control method.

There exists a hybrid drive system that is structured to drive a vehicle using the drive force from both the engine and the rotating electric machine (i.e., motor). The vehicle equipped with the hybrid drive system is normally driven in a fuel economy drive mode where the operation points of the engine and the rotating electric machine are determined while giving priority to fuel consumption. In the fuel economy drive mode, the engine is operated on its maximum efficiency line while giving priority to fuel consumption. That is, the optimum mileage control is executed. Therefore, it is often the case that the rotating electric machine is operated at the operating point with less efficiency, resulting in heat generation.

Japanese Unexamined Patent Application Publication No. 2006-46576 discloses a method for avoiding the heat generation of the rotating electric machine (especially the motor) by detecting the motor temperature so as to switch the drive mode to a mode that reduces the load exerted to the rotating electric machine. The method includes such drive modes as a fuel economy infinitely variable gear ratio mode (corresponding to the fuel economy drive mode), the fixed gear ratio mode, and the motor efficiency-priority infinitely variable gear ratio mode. Switching of those drive modes may be performed based on such indexes as the "heat generation temperature change" and the "heat generation temperature."

For switching the drive mode based on the "heat generation temperature," the heat generation temperature limit (second limit temperature MAX2) and the heat generation avoidance temperature (first limit temperature MAX1) are specified. The heat generation temperature limit stands for the "limit temperature when the heat generation temperature of the rotating electric machine is allowed to gradually increase." The heat generation avoidance temperature stands for the "temperature lower than the second limit temperature MAX2, for example, the temperature that may reach the second limit temperature after a predetermined duration."

The drive mode transition from a fuel consumption-priority infinite mode to a motor efficiency-priority infinite mode has been proposed in order to establish the relationship of the heat generation temperature limit (second limit temperature MAX2) that is greater than or equal to heat generation temperature that is greater than or equal to heat generation avoidance temperature (first limit temperature MAX1). The drive mode transition further to the fixed gear ratio mode is also proposed in order to establish the relationship of the heat generation temperature that is greater than heat generation temperature limit (second limit temperature MAX2).

In the aforementioned process, the heat generation avoidance temperature (first limit temperature MAX1) is preliminarily fixed to a predetermined single value.

SUMMARY

In the aforementioned process, the drive condition that may cause the heat generation of the rotating electric machine (such as the case when the vehicle is in the towing state, and the vehicle is in the hill-climbing state) is not considered. The predetermined drive mode switching is performed based on the "heat generation temperature change" or the "heat generation temperature" of the rotating electric machine.

When the heat generation temperature (hereinafter simply referred to as the temperature) exceeds the heat generation avoidance temperature, the drive mode is switched from the fuel economy drive mode to the rotating electric machine efficiency mode. The resultant change in the temperature of the rotating electric machine is shown in FIG. 14. Referring to the drawing, the abscissa axis denotes the time, and the ordinate axis denotes the temperature. FIG. 14 shows that the vehicle is not traveling in a loading/towing state, that is, having no load or towing load, and is traveling in the transition from the flat road to the uphill road.

The temperature of the rotating electric machine serving as the motor starts rising as the vehicle travels on the uphill road to reach the heat generation avoidance temperature (indicated as the motor output limit start temperature in the drawing). Then the drive mode is switched to the rotating electric machine efficiency mode to prevent the temperature from reaching the heat generation temperature limit (indicated as the motor limit temperature in the drawing). The temperature increase rate in the aforementioned state corresponds to the travel resistance generated accompanied with the hill-climbing of the vehicle.

The temperature increase rate of the vehicle that is not in the loading/towing state becomes different from that of the vehicle in the towing state, for example, in spite of the same condition of the hill climbing. That is, the temperature increase rate in the latter case becomes larger than that of the former case.

FIG. 15 shows the aforementioned state indicating the transition of the vehicle traveling from the flat road to the uphill road. Referring to the drawing, the thin solid line shows the change in the motor temperature when the vehicle is not in the loading/towing state and is climbing the hill (TM1). The two-dot chain line shows the change in the motor temperature when the motor output is not limited while the vehicle is in the towing state and is climbing the hill (TM2). The temperature change in the description occurs when the vehicle starts hill-climbing after traveling on the flat road where the motor temperature has the relatively high value th.

The dashed line shows the change in the motor temperature when the motor output is limited using the motor output limit start temperature as has been described above even when the vehicle is in the towing state and is climbing the hill (TM3). As those temperature changes show, when the motor output limit start temperature is fixed, the state where the temperature exceeds the motor limit temperature may occur when the vehicle is in the towing state.

The present invention thus provides, among other things, a hybrid drive system that executes load limit control to limit the load exerted to a rotating electric machine when the temperature of the rotating electric machine exceeds a predetermined value such that the temperature of the rotating electric machine serving as a motor is maintained under its tolerable temperature even if the running resistance increases when the vehicle is in a towing state.

According to an aspect of the present invention, a hybrid drive system includes an engine; at least one rotating electric machine, wherein the engine and the at least one rotating electric machine are capable of driving a vehicle; and a controller. The controller starts a load limit control that limits a load exerted to the rotating electric machine when a temperature of the rotating electric machine exceeds a load limit start temperature; detects a loading state or a towing state of the vehicle; and determines the load limit start temperature based on the loading state or the towing state detected.

According to an aspect of the present invention, a hybrid drive system includes an engine; at least one rotating electric machine, wherein the engine and the at least one rotating electric machine are capable of driving a vehicle; and a controller. The controller executes a load limit control that limits a load exerted to the rotating electric machine; detects a loading state or a towing state of the vehicle; and executes the load limit control based on the loading state or the towing state detected.

According to an aspect of the present invention, a hybrid drive system includes an engine; at least one rotating electric machine, wherein the engine and the at least one rotating electric machine are capable of driving a vehicle; and a controller. The controller starts a load limit control that limits a load exerted to the rotating electric machine when a temperature of the rotating electric machine exceeds a load limit start temperature; detects a travel resistance against the vehicle in a travel state; and determines the load limit start temperature based on the travel resistance detected.

According to an aspect of the present invention, a drive control method of a hybrid drive system with an engine and at least one rotating electric machine that are capable of driving a vehicle, includes the steps of detecting a loading state or a towing state of the vehicle upon starting a load limit control that limits a load exerted to the rotating electric machine when a temperature of the rotating electric machine exceeds a load limit start temperature; and determining the load limit start temperature based on the detected loading state or the detected towing state.

According to an aspect of the present invention, a drive control method of a hybrid drive system with an engine and at least one rotating electric machine that are capable of driving a vehicle, includes the steps of detecting a loading state or a towing state of the vehicle; and executing a load limit control that limits a load exerted to the rotating electric machine when the loading state or the towing state of the vehicle is detected.

According to an aspect of the present invention, a drive control method of a hybrid drive system with an engine and at least one rotating electric machine that are capable of driving a vehicle, includes the steps of detecting a travel resistance against the vehicle in a travel state upon starting a load limit control that limits a load exerted to the rotating electric machine when a temperature of the rotating electric machine exceeds a load limit start temperature; and determining the load limit start temperature based on the detected travel resistance.

BRIEF DESCRIPTION OF THE DRAWINGS

Various exemplary aspects of the invention will be described with reference to the drawings, wherein.

DETAILED DESCRIPTION OF EMBODIMENTS

1. First Embodiment

Figure 1:
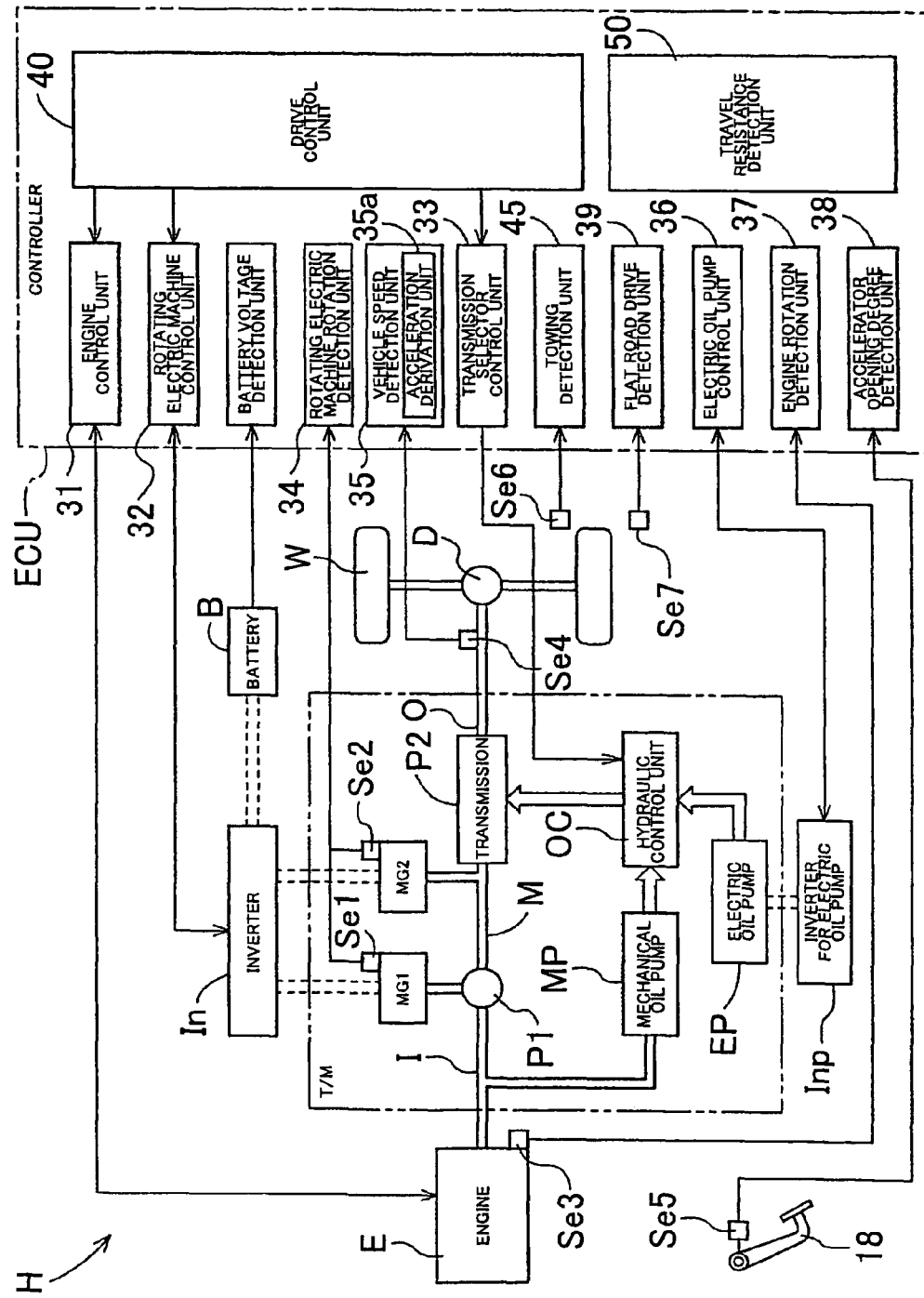
FIG. 1 is a diagram showing the system structure of a hybrid drive system according to the present invention.

A first embodiment of the present invention will be described referring to the drawings.

FIG. 1 is a diagram schematically showing the system structure of a hybrid drive system H according to the embodiment. Referring to the drawing, the double-solid line denotes a transmission path of the drive force, and the double-dashed line denotes the transmission path of the electric power. The unfilled arrow denotes the flow of the work fluid, and the solid arrow denotes the transmission path of various information data.

Figure 2:
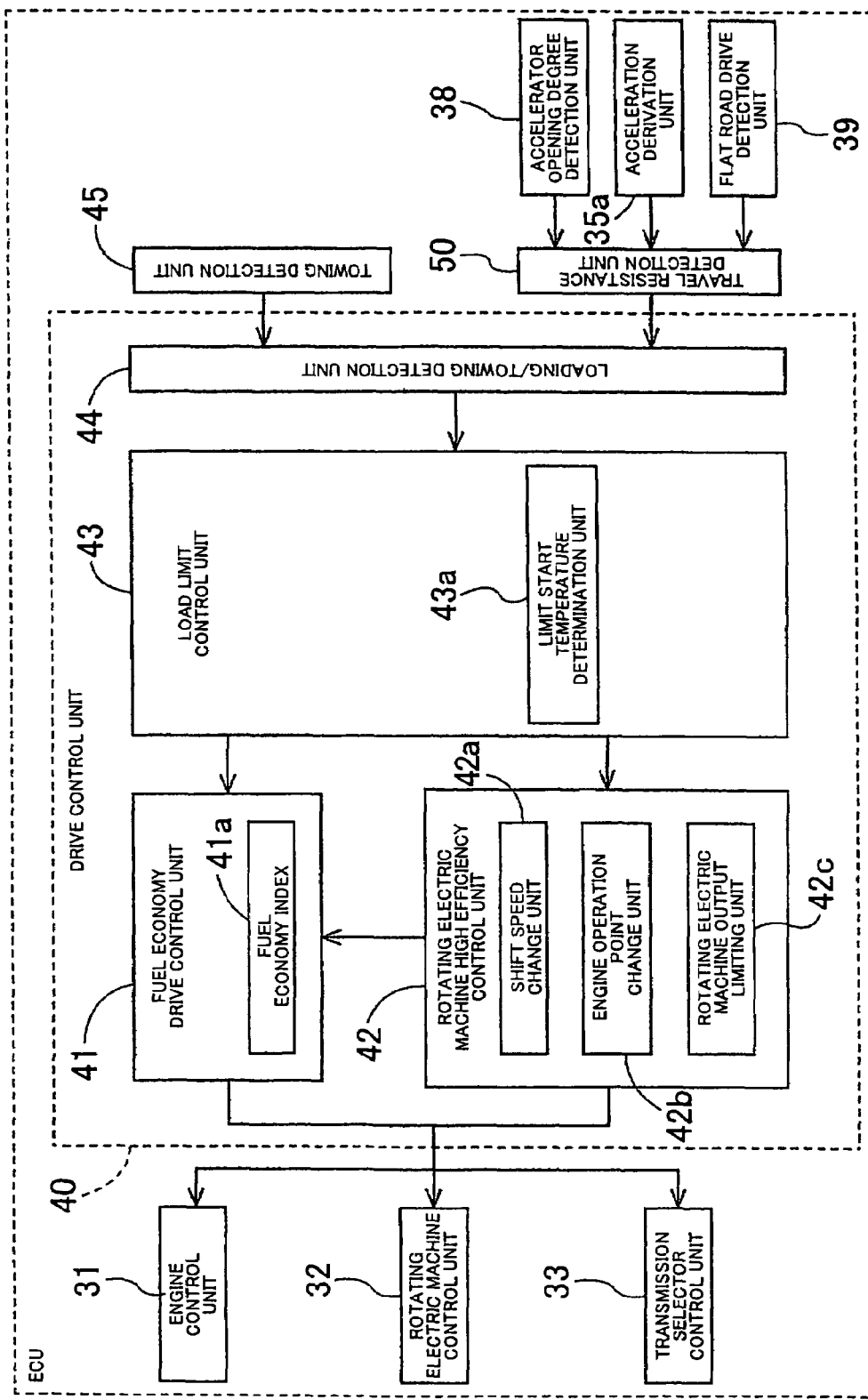
FIG. 2 is a diagram showing the functional structure of a drive control unit and its periphery.

FIG. 2 is a functional block diagram of the drive control unit for the rotating electric machines MG1, MG2 (including a motor for generating the drive force upon reception of the power supply, a generator for generating power upon reception of the drive force, and a rotating electric machine selectively functioning as the motor and the generator), and a drive control unit 40 provided for a transmission P2. The drive control unit 40 is equipped with a fuel economy drive control unit 41 and a rotating electric machine high efficiency control unit 42. The hybrid drive system H according to the present invention is structured to selectively drive the vehicle in the fuel economy drive mode where the operation points of the engine and the rotating electric machine are determined while giving priority to at least the fuel consumption, and the load limit control mode where the operation points of the engine and the rotating electric machine are determined under the load limit control by limiting the load exerted to the rotating electric machine serving as the motor (for example, MG2), which will be described in detail.

The load limit control is designed to execute the shift speed change control, the engine operation point change control, and the rotating electric machine output limit control, which are referred to as the rotating electric machine high efficiency control hereinafter.

The drive control unit 40 transmits the operation point of the engine to an engine control unit 31, the operation point of the rotating electric machine to a rotating electric machine control unit 32, and a shift speed to a transmission selector control unit 33, respectively. An engine E and the rotating electric machines MG1, MG2 are operated in the operation states determined by the drive control unit 40 (operation point of the engine, operation point of the rotating electric machine, and the shift speed), and the shift speed of the transmission P2 is determined for traveling.

System Structure

The hybrid drive system H is formed of an input shaft I connected to the engine E, an output shaft O connected to a wheel W, the first rotating electric machine MG1, the second rotating electric machine MG2, a power distribution mechanism P1 for distributing the drive force of the input shaft I into an intermediate shaft M and the first rotating electric machine MG1. The intermediate shaft M connected to the second rotating electric machine MG2 is provided with the transmission P2 for transmitting the rotating speed of the intermediate shaft M to the output shaft O.

In the aforementioned structure, the drive force from the engine E is distributed into the first rotating electric machine MG1 and the intermediate shaft M by the power distribution mechanism P1. The drive force from the second rotating electric machine MG2 is added to the drive force transmitted to the intermediate shaft M so as to be shifted by the transmission P2, and transmitted to the output shaft O.

1-1 Structure of Each Component of the Hybrid Drive System H

Referring to FIG. 1, the input shaft I is connected to the engine E. As the engine E, known engines of various types such as a gasoline engine and a diesel engine may be used. In the embodiment, the input shaft I is integrally connected to an output rotary shaft of the engine E such as the crankshaft. It is preferable to have the structure to connect the input shaft I with the output rotary shaft of the engine E via a damper, the clutch and the like there between.

The output shaft O is connected to the wheel W via a differential D so as to allow transmission of the drive force. If the power distribution mechanism P1 is formed as a single planetary gear, the intermediate shaft M is connected to the ring gear, the input shaft I is connected to the carrier, and the rotor of the first rotating electric machine MG1 is connected to the sun gear, respectively.

The engine E is operated in accordance with the control command (operation point of the engine) from the engine control unit 31 of the control unit ECU (which is an example of a controller). The hybrid drive system H according to the present invention is allowed to be operated at the operation points of the engine E including at least the operation point for giving priority to the fuel economy (shown as Po in FIG. 4), and the operation point (Pn shown in FIG. 4) at which engine torque is increased while keeping the engine output constant in order to operate the rotating electric machine with high efficiency.

Referring to FIG. 1, the first and the second rotating electric machines MG1 and MG2 are electrically coupled with a battery B serving as an electric storage device via an inverter In, respectively.

In the embodiment, the power distribution mechanism P1 is formed of the single planetary gear. The first rotating electric machine MG1 mainly generates power through the drive force input via the sun gear of the planetary gear to charge the battery B, or to feed the power for driving the second rotating electric machine MG2. The first rotating electric machine MG1 may serve as the motor while the vehicle is traveling at high speeds.

The second rotating electric machine MG2 mainly serves as a motor for complementing the drive force for traveling the vehicle. Upon deceleration of the vehicle, the second rotating electric machine MG2 functions as the generator to regenerate the inertia force of the vehicle as the electric energy. The first and the second rotating electric machines MG1 and MG2 are operated in accordance with the control command (operation point of the rotating electric machine) from the rotating electric machine control unit 32 of the control unit ECU.

The transmission P2 has the intermediate shaft M serving as an input member of the transmission, and the output shaft O serving as an output member of the transmission. The transmission P2 is equipped with plural friction engagement elements (not shown), engagement states of which may be selected upon reception of the hydraulic pressure such that plural shift speeds each having a different reduction ratio are established in accordance with the engagement state of the friction engagement elements. For example, the transmission capable of realizing at least two, three or four shift speeds each at a different reduction ratio may be employed as the transmission P2. The transmission that realizes five or more shift speeds may be employed as well.

The control operation according to the present invention relates to the control to be executed when the drive load is relatively large mainly in the loading state where the vehicle is loaded, or in the towing state where the vehicle tows a towed object. Accordingly, the drive control in the first and the second shift speeds will be described hereinafter.

Figure 5:
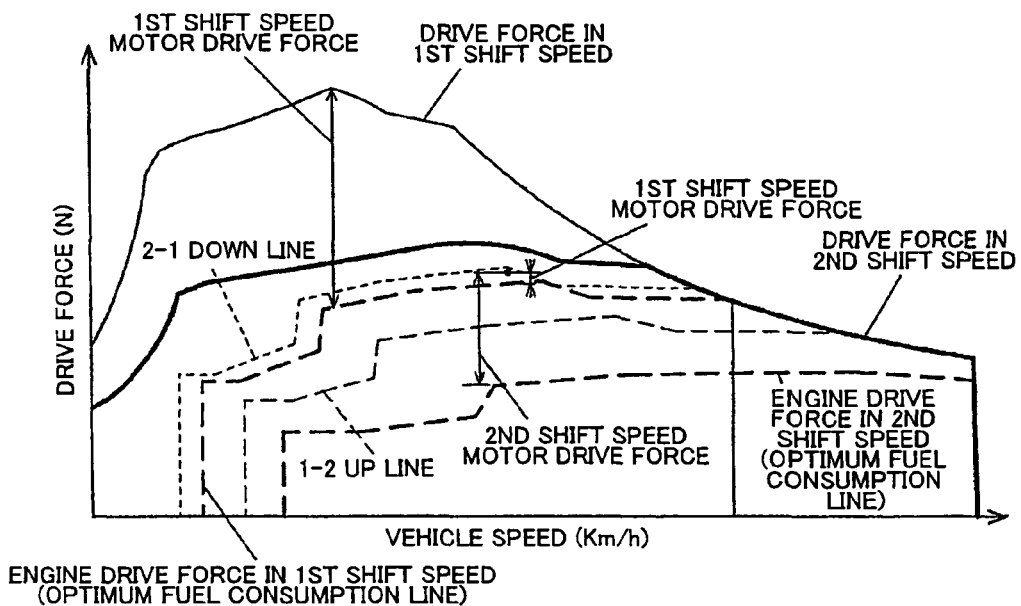
FIG. 5 shows a shifting map.

FIG. 5 shows a part of the shifting map (corresponding to the first and the second shift speeds) for the transmission P2 as described above. The shifting map shows the drive forces from the engine E and the rotating electric machine at the first and the second shift speeds (hereinafter, the rotating electric machine MG2 is assumed to serve as the motor) indicated by the thin solid line and the bold solid line, and the drive force indicated by the bold dashed line only from the engine E derived from the operation on the optimum fuel consumption line at the respective shift speeds.

With respect to the shifting operation, the transmission P2 is equipped with a predetermined number of selectable friction engagement elements (not shown) in accordance with the number of the shift speeds. The engagement state of the friction engagement element is selected in accordance with the desired shift speed to be realized. The shifting is performed by activating a hydraulic control unit OC in accordance with the operation command from the transmission selector control unit 33 to select the shift speed. As the friction engagement element of the aforementioned type, the multiple disc clutch, and the multiple disc brake that are hydraulically actuated may be employed.

While the engine E is operating, the work fluid is supplied to the hydraulic control unit OC by a mechanical oil pump MP. While the engine E is stopped, an electric oil pump EP supplies the work fluid. The mechanical oil pump MP is driven by the drive force of the input shaft I, and the electric oil pump EP is driven by the electric power (the supply path is not shown) supplied from the battery B via an inverter Inp for the electric oil pump.

1-2 Structure of the Control Unit ECU for the Hybrid Drive System H

Referring to FIG. 1, the control unit ECU as the controller controls operations of the engine E, the first and the second rotating electric machines MG1 and MG2, the respective friction engagement elements of the transmission P2 via the hydraulic control unit OC, and the electric oil pump EP and the like using the information data derived from sensors Se1 to Se7, which are examples of detectors, disposed at the respective portions of the vehicle.

More specifically, a first rotating electric machine rotating speed sensor Se1, a second rotating electric machine rotating speed sensor Se2, an engine speed sensor Se3, a vehicle speed sensor Se4, an accelerator opening degree detection sensor Se5, a towing sensor Se6, and a slope sensor Se7 are provided in the embodiment.

The first rotating electric machine rotating speed sensor Se1 detects the rotating speed of a rotor of the first rotating electric machine MG1.

The second rotating electric machine rotating speed sensor Se2 detects the rotating speed of a rotor of the second rotating electric machine MG2.

The engine speed sensor Se3 detects the rotating speed of the output rotary shaft of the engine E. As the input shaft I rotates integrally with the output rotary shaft of the engine E, the engine speed of the engine E detected by the engine speed sensor Se3 corresponds to the rotating speed of the input shaft I.

The vehicle speed sensor Se4 detects the rotating speed of the output shaft O for detecting the vehicle speed.

The accelerator opening degree detection sensor Se5 detects the operation amount of an accelerator pedal 18, that is, the opening degree of the accelerator.

The towing sensor Se6 detects whether the vehicle is towing a towed object.

The slope sensor Se7 detects whether the vehicle is traveling on the flat road.

The control unit ECU is formed of the engine control unit 31, the rotating electric machine control unit 32, the transmission selector control unit 33, a rotating electric machine rotation detection unit 34, a vehicle speed detection unit 35, an electric oil pump control unit 36, an engine rotation detection unit 37, an accelerator opening degree detection unit 38, a flat road drive detection unit 39, the drive control unit 40, a towing detection unit 45, and a travel resistance detection unit 50.

The aforementioned units of the control unit ECU are formed by mounting the function units for executing various processes with respect to the input data with hardware and/or software (program) having the calculation unit such as the CPU as the core member.

The engine control unit 31 executes the operation control including the start and stop of the engine E, the rotating speed control, and the output torque control. Referring to FIG. 2, the engine control unit 31 receives the operating point of the engine from the drive control unit 40 as the command information such that the engine E is operated at the engine speed and the output torque that have been specified as the operation point.

The rotating electric machine control unit 32 executes the operation control including the rotating speed control and the rotating torque control of the first and the second rotating electric machines MG1 and MG2, via the inverter In. The rotating electric machine control unit 32 receives the operation points of the respective rotating electric machines MG1 and MG2 from the drive control unit 40 as the command information such that the inverter In is activated to operate the rotating electric machines MG1 and MG2 at the rotating speed and output torque specified as the operation points.

The transmission selector control unit 33 executes the operation control to engage/disengage the friction engagement elements of the transmission P2 via the hydraulic control unit OC. Referring to FIG. 2, the transmission selector control unit 33 receives the shift speed to be selected by the transmission P2 from the drive control unit 40 as the command information such that the shift speed is established by the transmission P2 by supplying or stopping the supply of the hydraulic pressure to the friction engagement elements of the transmission P2, and releasing the hydraulic pressure for setting the shift speed of the transmission P2.

The rotating electric machine rotation detection unit 34 detects the rotating speeds of the first and the second rotating electric machines MG1 and MG2 based on the outputs of the first and the second rotating electric machine rotating speed sensors Se1 and Se2.

The vehicle speed detection unit 35 detects the vehicle speed based on the output of the vehicle speed sensor Se4. The vehicle speed detection unit 35 is equipped with an acceleration derivation unit 35a for deriving the acceleration of the vehicle from the vehicle speed detected by the vehicle speed detection unit 35 over time.

The electric oil pump control unit 36 executes the operation control of the electric oil pump EP via the inverter Inp for the electric oil pump.

The engine rotation detection unit 37 detects the rotating speeds of the output rotary shaft and the input shaft I of the engine E based on the output from the engine speed sensor Se3.

The accelerator opening degree detection unit 38 obtains the accelerator opening decree based on the output from the accelerator operation detection sensor Se5 to estimate the required drive force from the obtained accelerator opening degree.

The towing detection unit 45 detects whether the vehicle is towing a towed object based on the output from the towing sensor Se6.

The flat road drive detection unit 39 detects whether the vehicle is traveling in the horizontal direction based on the output from the slope sensor Se7.

The above explanations relate to the basic control structure executed in the hybrid drive system H according to the present invention as shown in FIG. 1. The control unit ECU is equipped with the drive control unit 40 as shown in FIGS. 1 and 2 so as to output the appropriate operation points for the engine E and the rotating electric machines MG1 and MG2 to the engine control unit 31, the rotating electric machine control unit 32, and the transmission selector control unit 33, and to output the shift speed to the transmission P2.

Referring to FIG. 2, the drive control unit 40 is provided with the fuel economy drive control unit 41, the rotating electric machine high efficiency control unit 42 and a load limit control unit 43.

Fuel Economy Drive Control Unit 41

The fuel economy drive control unit 41 obtains the operation points of the engine and the rotating electric machine by giving priority to the fuel economy. Referring to FIG. 2, the fuel economy drive control unit 41 includes a fuel economy index 41a, based on which the engine operation point Po is derived under the fuel economy control.

Figure 4:
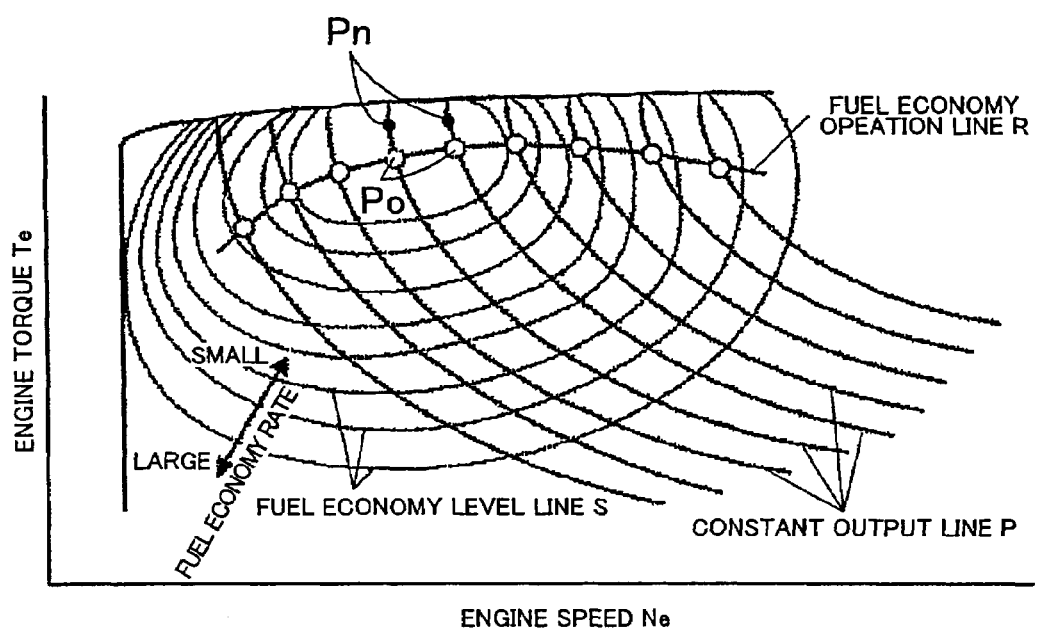
FIG. 4 is a view showing the structure of the fuel economy index.

The fuel economy index 41a is, for example, the value derived from preliminarily obtaining the operation point Po on the fuel economy operation line R shown in FIG. 4 as the index for the relationship between the engine speed and the engine torque. FIG. 4 is a graph having the abscissa axis as the engine speed Ne, the ordinate axis as the engine torque Te, showing the substantially oval shaped fuel consumption level lines S, and the constant-output lines P as well. Referring to the drawing, the fuel economy rate is three-dimensionally distributed, and the fuel economy operation line R is formed by connecting each peak of the fuel economy rate level lines. The operation points Po on the fuel economy operation line R in the fuel economy drive mode of the engine may be obtained by combining the engine speed and the engine torque.

The bold dashed line as explained referring to FIG. 5 denotes the engine torque obtained under the fuel economy drive control. Accordingly, the aforementioned fuel economy index 41a may be prepared for the respective shift speeds to be established by the transmission P2.

The fuel economy index 41a is prepared in advance for the state where the vehicle is not loaded and does not tow any towed object.

The fuel economy drive control unit 41 obtains the shift speed established when the vehicle is not in the loading/towing state based on the required drive force in accordance with the current vehicle speed and the accelerator opening degree in reference to the shifting map shown in FIG. 5. Then, the operation point of the engine in the fuel economy drive mode when the vehicle is not in the loading/towing state, and the operation point of the rotating electric machine corresponding to the operation point of the engine are derived to output the control commands to the engine control unit 31, the rotating electric machine control unit 32, and the transmission selector control unit 33 for allowing the vehicle to travel in the fuel economy drive mode.

Rotating Electric Machine High Efficiency Control Unit 42

The rotating electric machine high efficiency control unit 42 is the unit for deriving the shift speed, the engine operation point, and the rotating electric machine operation point, and realizes the control for reducing the load exerted to the rotating electric machine serving as the motor (for example, MG2), relative to the travel state realized by the aforementioned fuel economy drive control unit 41.

Referring to FIG. 2, the rotating electric machine high frequency control unit 42 is provided with a shift speed change unit 42a, an engine operation point change unit 42b, and a rotating electric machine output limiting unit 42c, respectively.

Shift Speed Change Unit 42a

The shift speed change unit 42a sets the shift speed of the transmission P2 to be lower than the shift speed selected in the fuel economy drive mode where no load limit control is executed, in order to realize the rotating electric machine high efficiency control.

When the load limit control is required for the vehicle traveling in the fuel economy drive mode at the second shift speed, the first shift speed is selected.

Engine Operation Point Change Unit 42b

The engine operation point change unit 42b increases the engine torque to be greater than the one in the fuel economy drive mode while maintaining the engine output constant, in order to realize the rotating electric machine high efficiency control. Referring to FIG. 4, transition is made from the fuel economy drive mode at the engine operation point indicated by the point Po to the operation point Pn where the engine torque is increased on the constant-output line P.

Rotating Electric Machine Output Limiting Unit 42c

The rotating electric machine output limiting unit 42c limits the output of the rotating electric machine MG2 such that the rotating electric machine high efficiency control is realized. By controlling the engine operation point, the insufficiency in the output resulting from the output limit is compensated. In the aforementioned case, the operation point of the rotating electric machine for limiting the output of the rotating electric machine MG2 is selected until the predetermined output limit value of the rotating electric machine MG2 is reached. This makes it possible to prevent the temperature increase of the rotating electric machine MG2.

As described above, the hybrid drive system H is operated at the shift speed, the engine operation point and the operation point of the rotating electric machine that are selected by the rotating electric machine high efficiency control unit 42, thus making it possible to suppress the temperature increase of the rotating electric machine MG2 compared with the travel state under the fuel economy drive control.

Referring to FIG. 2, the drive control unit 40 includes the load limit control unit 43 provided with a limit start temperature determination unit 43a.

Load Limit Control Unit 43

The load limit control unit 43 determines whether the transition is made to the drive mode determined by the rotating electric machine high efficiency control unit 42 while traveling in the drive mode determined by the normal fuel economy drive control unit 41. The load limit control unit 43 starts the load limit control for limiting the load exerted to the rotating electric machine MG2 when the temperature of the rotating electric machine exceeds the load limit start temperature.

The load limit control unit 43 includes the limit start temperature determination unit 43a that determines the aforementioned load limit start temperature to be set to a rotating electric machine output limit start temperature T3, the shift speed change temperature T1 and engine operation point change temperature T2 that are lower than the temperature T3.

Figure 6:
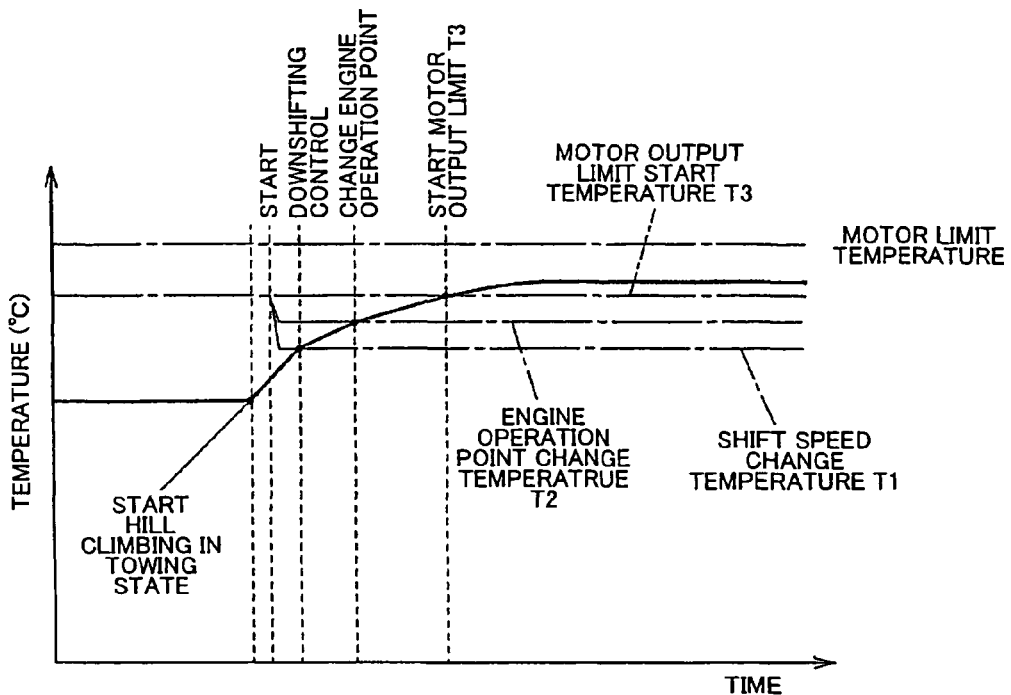
FIG. 6 is a graph showing the temperature increase upon execution of the load limit control.

The hybrid drive system H according to the present invention is structured to select the load limit start temperature from three types of temperatures, that is, the shift speed change temperature T1, the engine operation point change temperature T2, and the rotating electric machine output limit start temperature T3 (indicated as the motor output limit start temperature in the drawing) as shown in FIG. 6.

The shift speed change temperature T1 is set for starting the shift speed change control executed by the shift speed change unit 42a as described above.

The engine operation point change temperature T2 is set for starting the engine operation point change control executed by the engine operation point change control unit 42b as described above.

The rotating electric machine output limit start temperature T3 is set for starting the rotating electric machine output limit control executed by the rotating electric machine output limiting unit 42c as described above.

Basically, the load limit start temperature as described above will become higher in the order from the shift speed change temperature T1, the engine operation point change temperature T2, and the rotating electric machine output limit start temperature T3.

When the vehicle is in the towing state, the aforementioned shift speed change control, the engine operation point change control, and the rotating electric machine output limit control are executed at the load limit start temperature selected from the three types of the load limit start temperatures of T1, T2 and T3, respectively.

The load limit control unit 43 is provided with a loading/towing detection unit 44 for allowing the control start temperature determination unit 43a to be operated in the load limit control unit 43. Furthermore, the towing detection unit 45, the travel resistance detection unit 50, the accelerator opening degree detection unit 38, and the accelerator derivation unit 35a are provided for obtaining the required information.

Towing Detection Unit 45

The towing detection unit 45 detects whether a towed object is connected to the vehicle based on the output of the towing detection sensor Se6 operated by the driver of the vehicle (the sensor may be a switch operated by the driver when a towed object is connected to the vehicle, or a switch disposed at the junction with the towed object for automatically detecting the connected state when the towed object is connected to the vehicle).

Travel Resistance Detection Unit 50

The travel resistance detection unit 50 detects the travel resistance against the vehicle in operation based on the relationship between the accelerator opening degree (required drive force) detected by the accelerator opening degree detection unit 38 and the vehicle acceleration detected by the acceleration derivation unit 35a.

As the travel resistance may be required to be detected in the state where the vehicle is traveling on the flat road (it is necessary when the increase in the weight of the vehicle in the towing state), the flat road drive detection unit 39 is provided for detecting the travel resistance based on the information with respect to the traveling on the flat road.

The increase in the travel resistance is detected by the loading/towing detection unit 44 based on the relationship between the actual travel resistance detected by the travel resistance detection unit 50 and the flat road vehicle travel resistance generated when the vehicle that is not in the loading/towing state is traveling on the flat road. As a result, the increase in the travel resistance resulting from the towing of the towed object is obtained.

The transmission torque input to the transmission P2 in the travel state is obtained based on the accelerator opening degree, engine speed, and the rotating speed of the second rotating electric machine in reference to the map so as to obtain the actual travel resistance using the following equation:

Actual travel resistance=torque input to the transmission×gear ratio×differential ratio/radius of tire−gear loss−vehicle weight×acceleration, where the vehicle weight denotes the weight of the vehicle not in the loading/towing state or the weight of the vehicle in the loading or towing state that includes the increased amount as a result of the loading or towing, and the gear loss may be derived in accordance with the gear speed in reference to the map.

Meanwhile, when the vehicle is traveling on the flat road in the loading or towing state, the increase in the weight of the vehicle as a result of the loading or towing may be derived from the following equation, using the flat road travel resistance of the vehicle not in the loading/towing state, the weight of the vehicle itself, and the acceleration:

Increase in the vehicle weight in the loading/towing state=(transmission input torque×gear ratio×differential ratio/radius of tire−flat road travel resistance of the vehicle not in the loading/towing state−gear loss)/acceleration−weight of the vehicle itself.

The flat road travel resistance of the vehicle not in the loading/towing state is obtained based on the vehicle speed, the gear loss is obtained based on the gear speed in reference to the map, and the weight of the vehicle itself is stored separately.

The drive control of the hybrid drive system H according to the first embodiment will be described referring to FIGS. 3 to 6.

Figure 3:
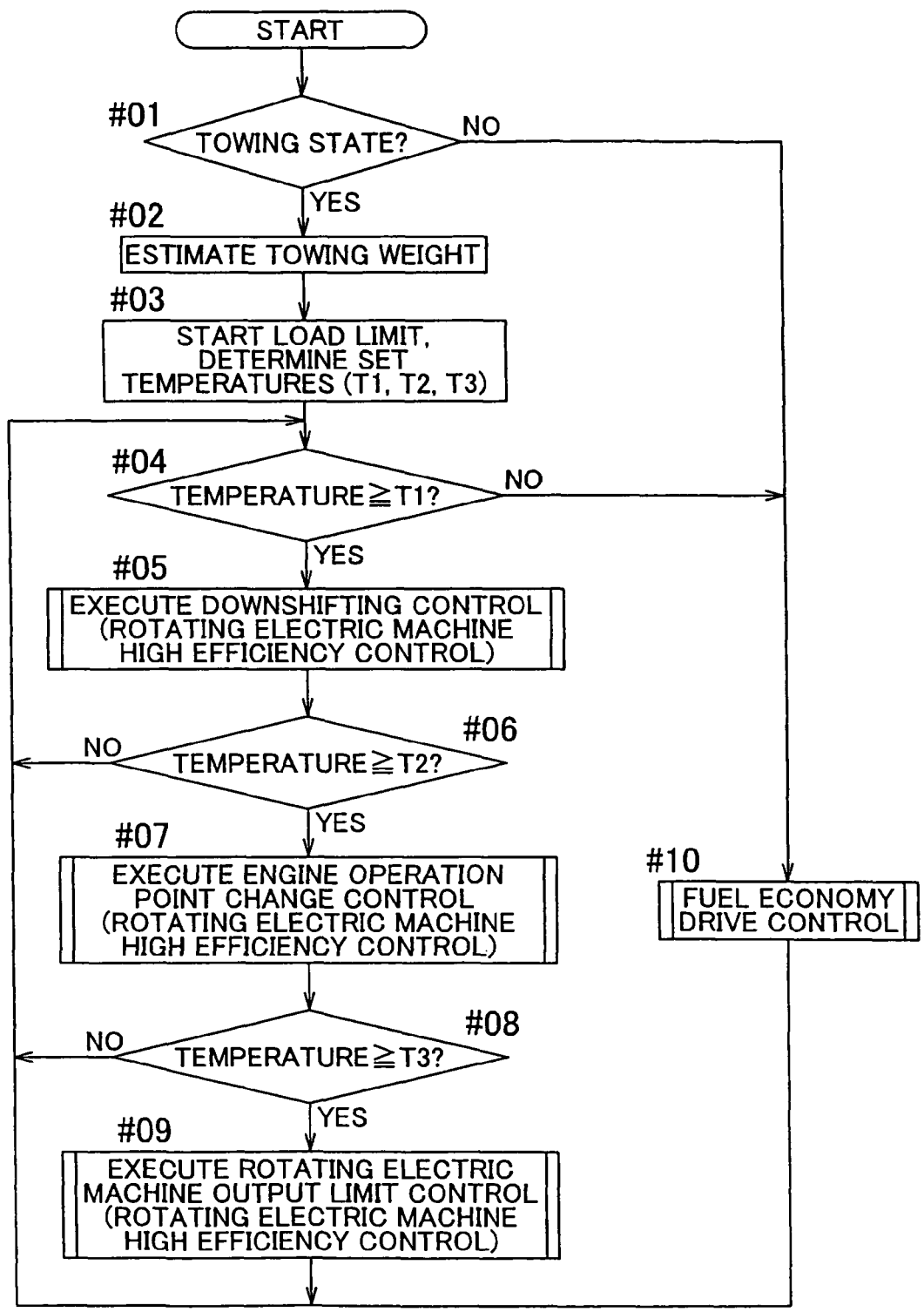
FIG. 3 is a flowchart showing a process of the load limit control according to a first embodiment.

The flowchart shown in FIG. 3 includes the drive control (left flow) in the state where the vehicle is connected to a towed object, and the drive control (right flow) in the state where the vehicle is not connected to a towed object.

Referring to the flowchart, the drive control unit 40 determines whether a towed object is connected to the vehicle based on the information sent from the towing detection unit 45 via the loading/towing detection unit 44. If it is determined that the vehicle is not in a towing state (no in step #1), the fuel economy drive control in accordance with the shifting map shown in FIG. 5 is executed (step #10). In other words, the fuel economy drive control unit 41 is normally activated without executing the load limit control.

Meanwhile, if it is determined that the vehicle is in a towing state (yes in step #1), the load limit control unit 43 executes the load limit control.

In the aforementioned state, the loading/towing detection unit 44 is activated to execute the towing weight estimation (increase in the vehicle weight) resulting from the connection with the towed object (step #2). Then in accordance with the estimated weight of the vehicle in the towing state, the limit start temperature determination unit 43a provided in the load limit control unit 43 determines the load limit start temperatures T1, T2 and T3 (step #3). When the weight of the vehicle in the towing state is equal to or more than a predetermined value, the preliminarily stored values of the load limit start temperatures T1, T2 and T3 may be used, or alternatively, they may be changed in accordance with the estimated weight of the vehicle in the towing state in the same manner as in FIG. 9 to be described later. That is, in the range where the weight of the vehicle in the towing state is lower than the predetermined value, all the limit start temperatures T1, T2 and T3 may be set to be equal to the motor output limit start temperature T3. In a predetermined range, the shift speed change temperature T1 and the engine operation point change temperature T2 may be reduced accompanied with the increase in the weight of the vehicle in the towing state. In a higher range, the limit start temperatures T1, T2 and T3 may be fixed to values on the lower side.

When the vehicle in the towing state is climbing the hill after the preliminary processing, the temperature of the rotating electric machine MG2 serving as the motor gradually rises. The fuel economy drive mode is maintained until the temperature reaches the shift speed change temperature T1 (no in step #4) irrespective of the temperature rise. If the temperature reaches the shift speed change temperature T1 (yes in step #4), the downshifting control is executed (step #5). When execution of the load limit control is required when the vehicle is traveling in the fuel economy drive mode at the operation point indicated as the black circle shown in FIG. 5 at the second shift speed, the shift speed is downshifted to the first shift speed. The process is executed by the shift speed change unit 42a as a kind of the rotating electric machine high efficiency control.

Referring to FIG. 6, when the temperature further rises to reach the engine operation point change temperature T2 (yes in step #6) irrespective of execution of the first rotating electric machine high efficiency control, the engine operation point change control is executed (step #7). That is, with the fuel economy index shown in FIG. 4, the operation point Pn is obtained along the increase of the engine torque on the constant-output line P. The operation point Pn deviates from the operation point Po under the fuel economy control. Then, the operation point corresponding to the decrease resulting from the increase in the engine torque is selected as the operation point of the rotating electric machine MG2. The process is executed by the engine operation point change unit 42b as a kind of the rotating electric machine high efficiency control.

When the temperature further rises to reach the rotating electric machine output limit temperature T3 irrespective of execution of the rotating electric machine high efficiency control as shown in FIG. 6 (yes in step #8), the rotating electric machine output limit control is executed (step #9) to limit the output of the rotating electric machine MG2 serving as the motor. The process is executed by the rotating electric machine output limiting unit 42c as a kind of the rotating electric machine high efficiency control.

Referring to FIG. 6, the sequential execution of the rotating electric machine high efficiency control accompanied with the aforementioned temperature rise may suppress the temperature rise within the predetermined range (lower than the tolerable limit temperature of the motor).

2. Second Embodiment

In the first embodiment, the increase in the travel resistance against the vehicle in the towing state, that becomes noticeable in the hill climbing, may be absorbed by setting the limit start temperatures T2 and T3. The limit start temperature may be appropriately set in accordance with the increase in the travel resistance.

Figure 7:
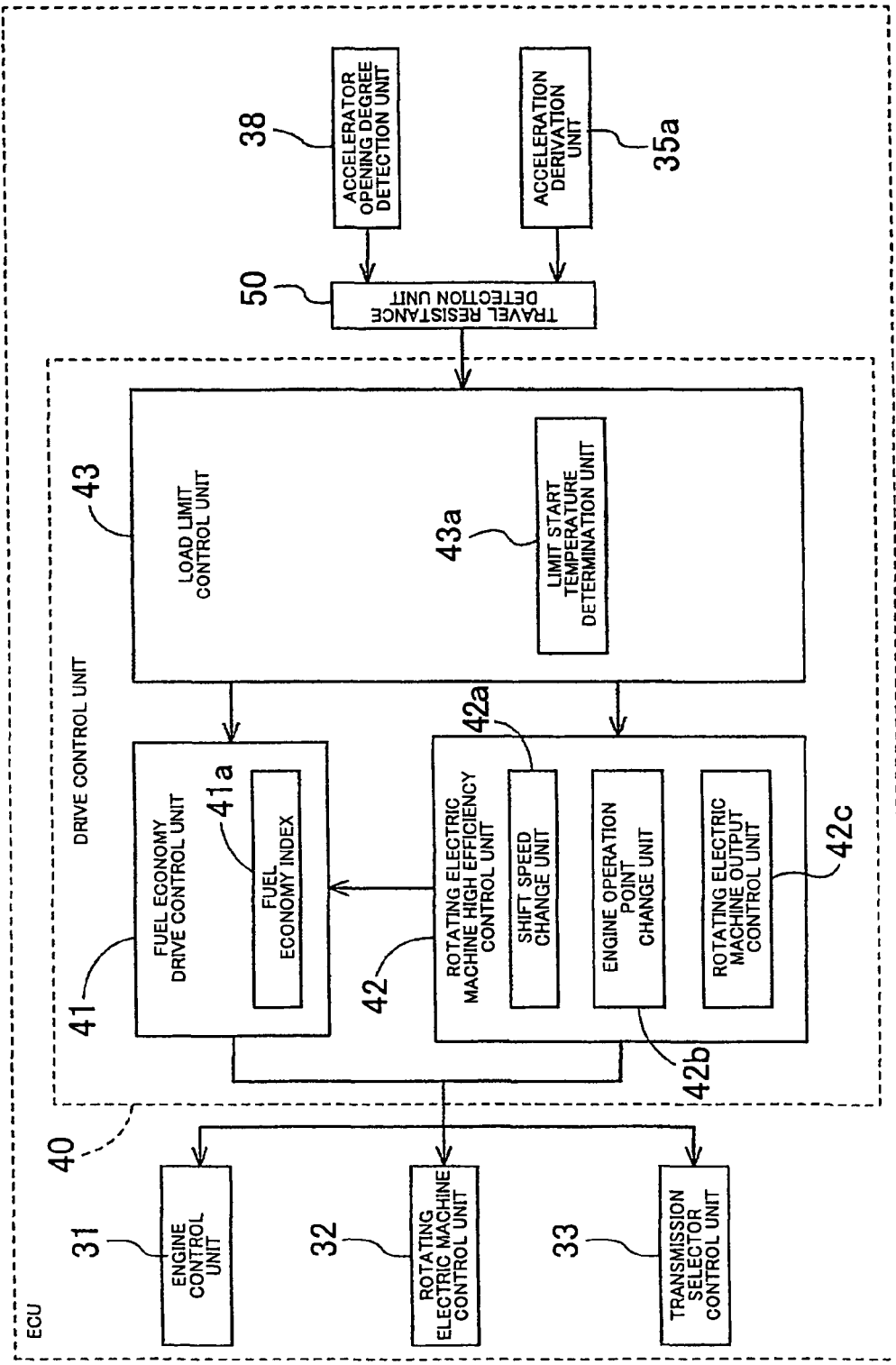
FIG. 7 is a diagram showing the functional structure of the drive control unit and its periphery according to a second embodiment.
Figure 8:
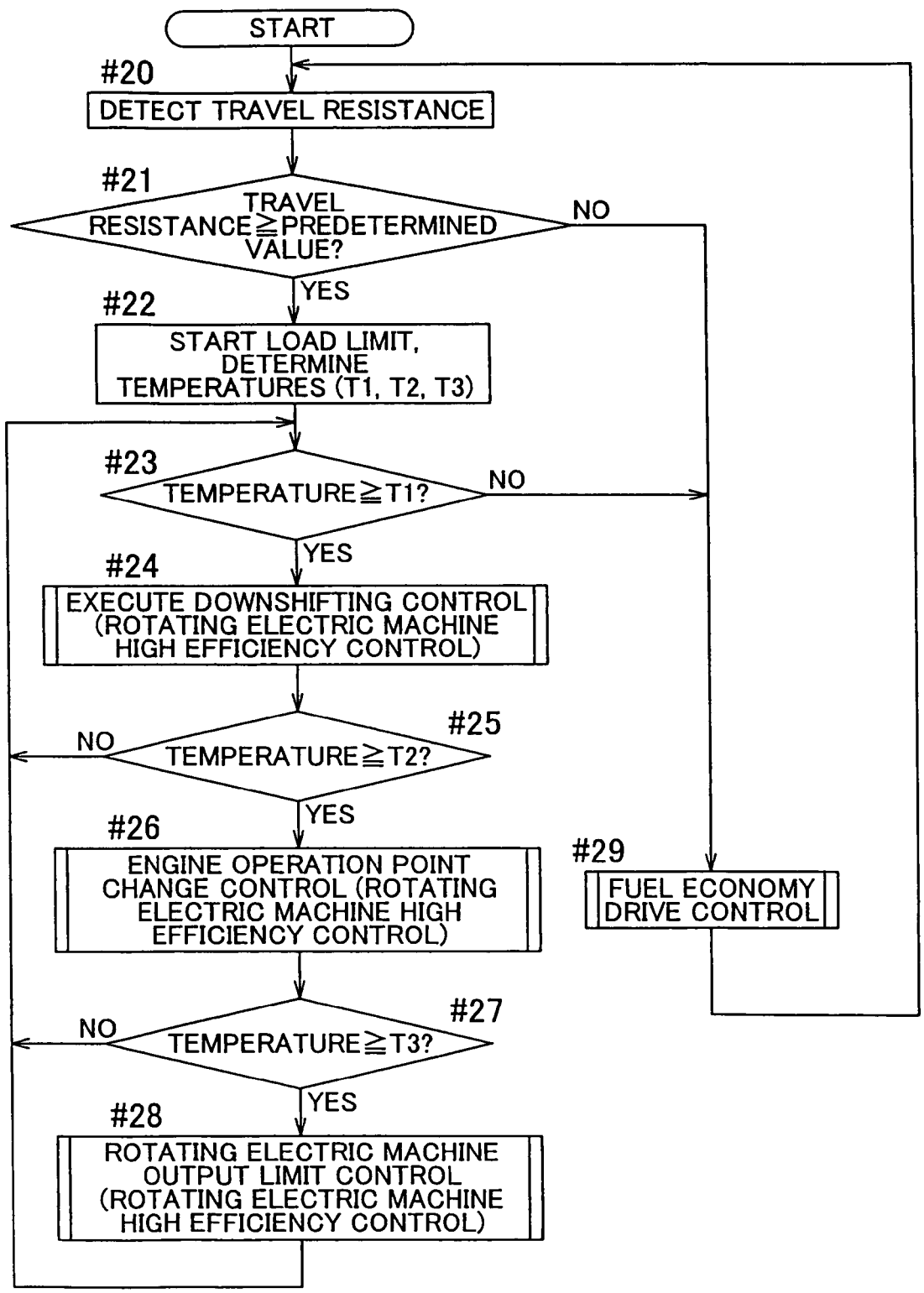
FIG. 8 is a flowchart showing a process of the load limit control according to the second embodiment.
Figure 9:
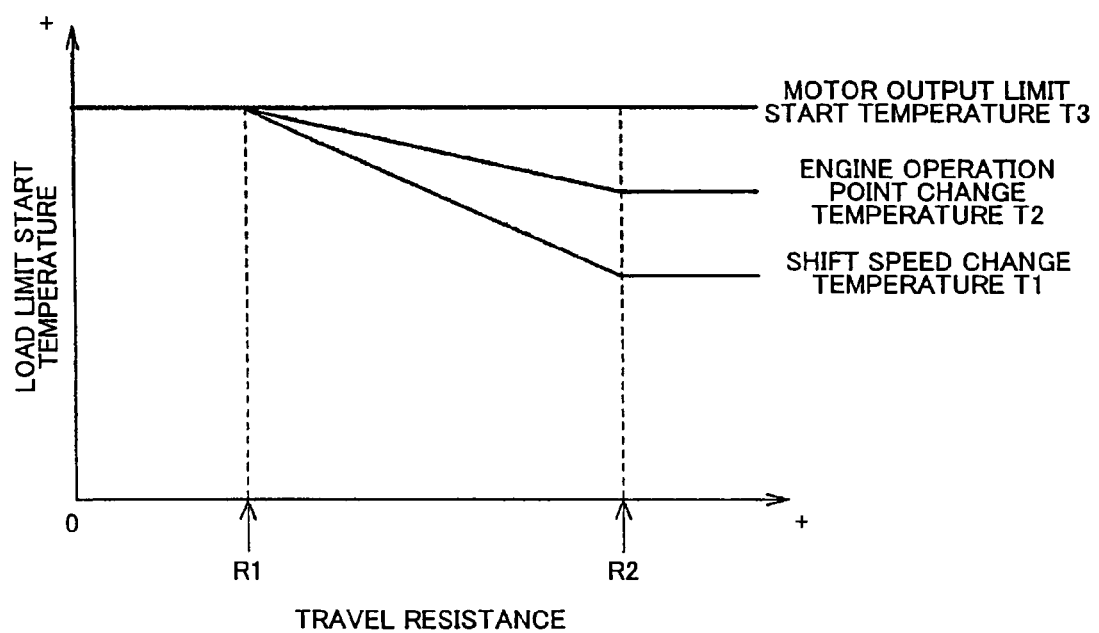
FIG. 9 is a temperature map used in the second embodiment.

FIG. 7 shows the aforementioned structure of the drive control unit 40 and its periphery corresponding to the first embodiment shown in FIG. 2. The flowchart of the second embodiment is shown in FIG. 8. FIG. 9 shows a temperature map representing each relationship between the travel resistance and the limit start temperatures T1, T2 and T3, respectively according to the embodiment.

Referring to FIG. 7 of this embodiment, the travel resistance detected by the travel resistance detection unit 50 is directly input to the load limit control unit 43.

The limit start temperature determination unit 43a provided in the load limit control unit 43 sets the limit start temperatures T1, T2 and T3 in accordance with the travel resistance in reference to the temperature map shown in FIG. 9. Referring to the temperature map, in the range where the travel resistance is lower than the first travel resistance R1, all the limit start temperatures T1, T2 and T3 are the same as the motor output limit start temperature T3. In the range from the first to the second travel resistances, that is, from R1 to R2, the shift speed change temperature T1 and the engine operation point change temperature T2 are decreased as the increase in the travel resistance. In the range equal to or higher than the second travel resistance R2, the limit start temperatures T1, T2 and T3 are fixed to values at the lower side, respectively. In the aforementioned case, the shift speed change temperature T1, the engine operation point change temperature T2, and the motor output limit start temperature T3 are set to be higher in this order.

The drive control for the hybrid drive system H according to the second embodiment will be described referring to FIG. 8.

The flowchart shown in FIG. 8 includes the travel control (right flow) in the state where the travel resistance against the vehicle is smaller than a predetermined value, and the travel control (left flow) in the state where the travel resistance is equal to or greater than the predetermined value.

Referring to the flowchart, the drive control unit 40 allows the travel resistance detection unit 50 to detect the travel resistance (step #20) such that the control is separated in accordance with the detected travel resistance. If the detected travel resistance is smaller than the predetermined value (no in step #21), the fuel economy drive control in reference to the shifting map shown in FIG. 5 is executed (step #29). That is, the fuel economy drive control unit 41 is normally activated without executing the load limit control.

Meanwhile, if the detected travel resistance is equal to or greater than the predetermined value (yes in step #21), the load limit control unit 43 executes the load limit control. That is, the towing state of the vehicle is detected, and the weight of the vehicle in the towing state when traveling on the flat road is obtained in the same manner as in the first embodiment so as to calculate the travel resistance in consideration of the weight increase of the vehicle in the towing state.

The limit start temperature determination unit 43a provided in the load limit control unit 43 determines the load limit start temperatures T1, T2 and T3 in accordance with the detected travel resistance in reference to the temperature map shown in FIG. 9 (step #22). The aforementioned process is executed while the vehicle is traveling on the flat road.

After the preliminary process, the temperature of the rotating electric machine MG2 serving as the motor gradually rises for some reason as shown in FIG. 6. In spite of the temperature rise, the fuel economy drive control is maintained until the temperature reaches the shift speed change temperature T1 (no in step #23). When the temperature reaches the shift speed change temperature T1 (yes in step #23), the downshifting control is executed (step #24). For example, in the state where the vehicle is traveling under the fuel economy drive mode at the operation point indicated by the black circle on the shifting map shown in FIG. 5 at the second shift speed, when it is determined that the load limit control is required, downshifting to the first shift speed is performed. The aforementioned process is executed by the shift speed change unit 42a.

Referring to FIG. 6, when the temperature further rises to reach the engine operation point change temperature T2 irrespective of execution of the first rotating electric machine high efficiency control (yes in step #25), the engine operation point change control is executed (step #26). That is, the operation point Pn is obtained along the engine torque increase on the constant-output line P, with the fuel economy index shown in FIG. 4. The obtained operation point Pn deviates from the operation point Po under the fuel economy control. The operation point corresponding to the decrease resulting from the increase in the engine torque is selected as the operating point of the rotating electric machine MG2.

When the temperature further rises to reach the rotating electric machine output limit temperature T3 irrespective of execution of the aforementioned rotating electric machine high efficiency control (yes in step #27), the rotating electric machine output limit control is executed (step #28). That is, the output of the rotating electric machine MG2 serving as the motor is limited.

Execution of the rotating electric machine high efficiency control sequentially as the temperature rise as shown in FIG. 6 makes it possible to suppress the temperature rise within a predetermined range (lower than the motor limit temperature).

3. Third Embodiment

In the first embodiment, the increase in the travel resistance against the vehicle in the towing state, which becomes noticeable in the hill climbing, may be absorbed by decreasing the limit start temperature. Meanwhile, in the second embodiment, the limit start temperature is decreased directly in accordance with the increase in the travel resistance.

The third embodiment is structured to absorb the increase in the travel resistance against the vehicle in the loading state, which becomes noticeable in the hill climbing.

Figure 10:
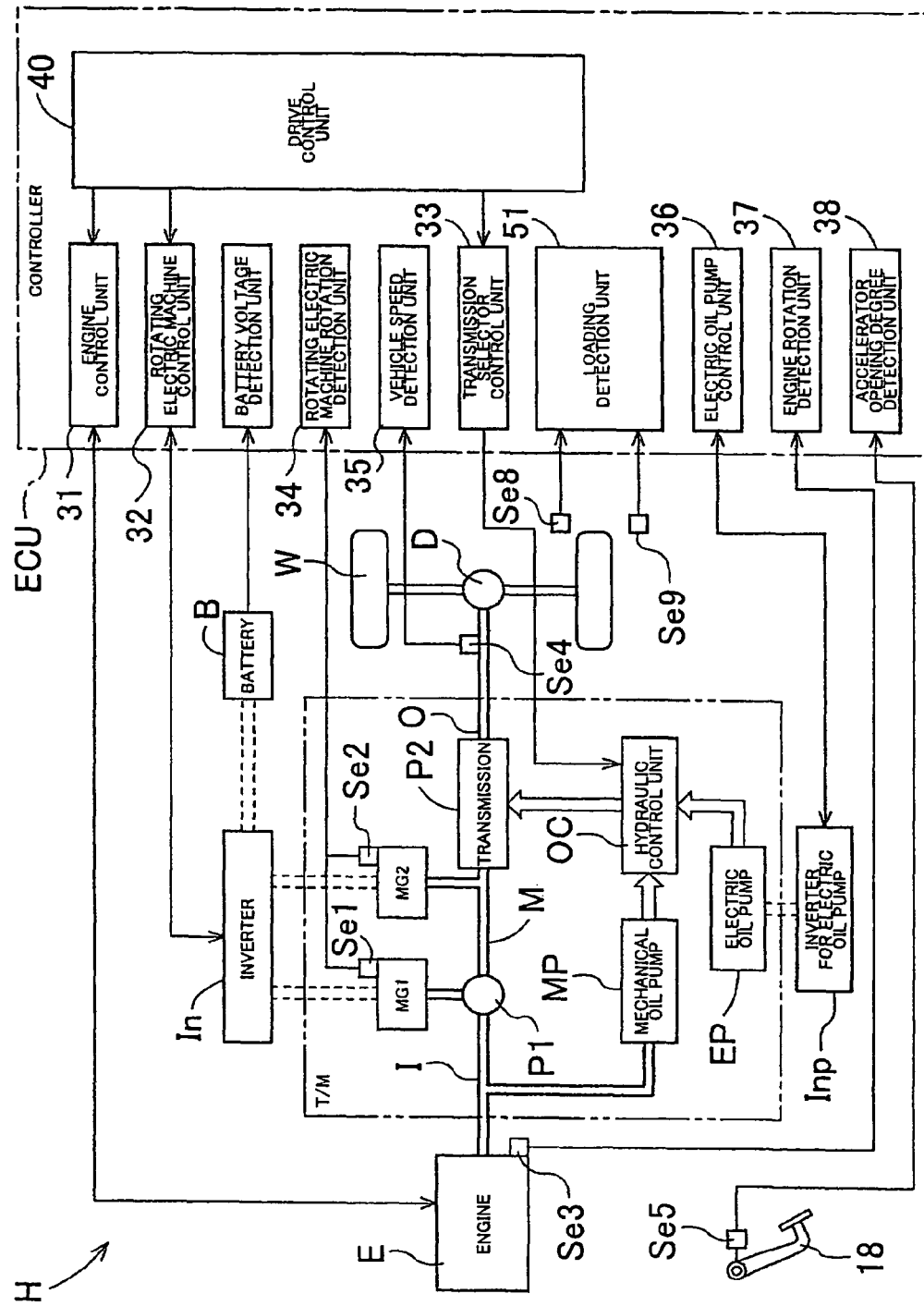
FIG. 10 is a diagram showing the system structure of a hybrid drive system according to a third embodiment.
Figure 11:
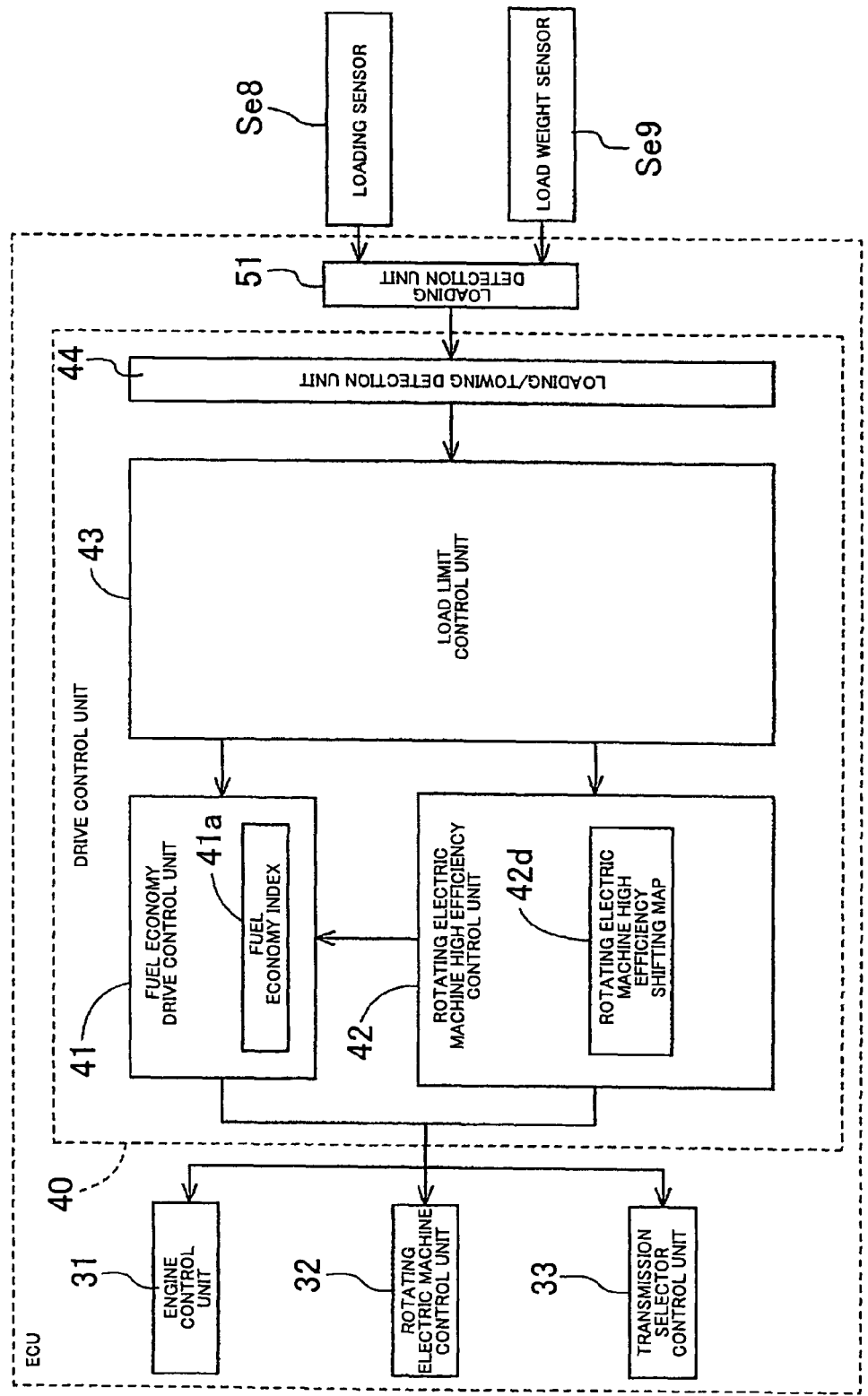
FIG. 11 is a diagram showing the functional structure of the drive control unit and its periphery according to the third embodiment.
Figure 12:
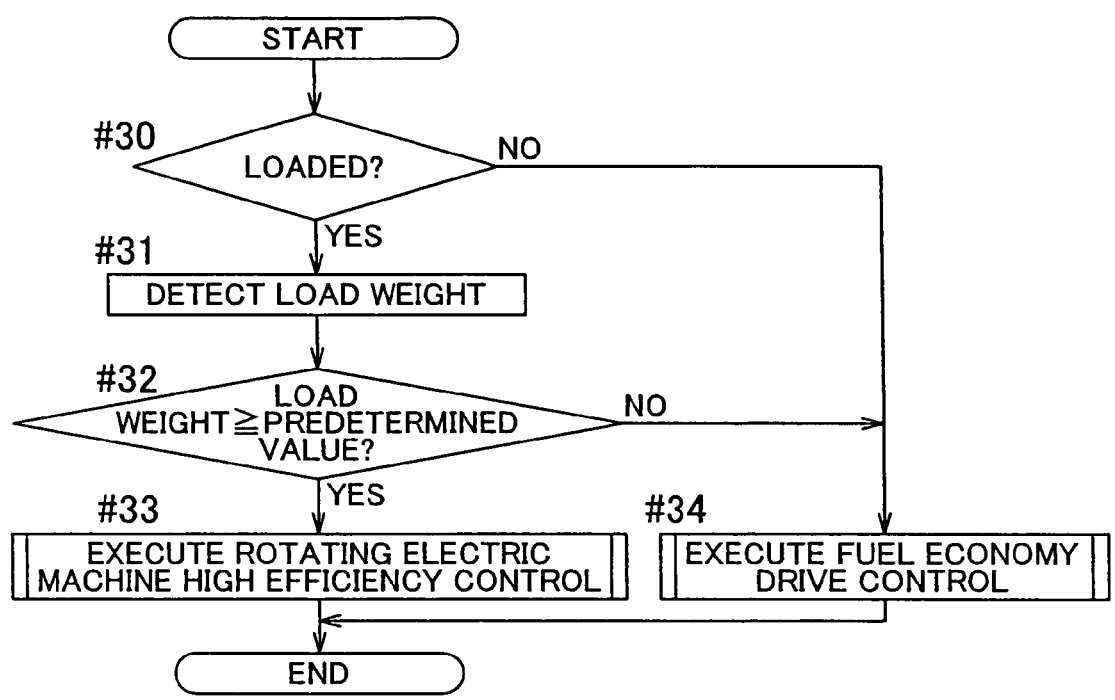
FIG. 12 is a flowchart showing a process of the load limit control according to the third embodiment.

FIGS. 10 and 11 show the aforementioned structure corresponding to the first embodiment shown in FIGS. 1 and 2. The flowchart of the embodiment is shown in FIG. 12.

Referring to FIGS. 10 and 11, the loading state of the vehicle detected by the loading/towing detection unit 44 is input to the load limit control unit 43. The load limit control unit 43 determines whether the load limit control is executed in accordance with the determination as to whether the increase in the travel resistance in the loading state is estimated.

In the system, the loading detection unit 51 detects presence/absence of the load, and the load weight based on the detection results of the load sensor Se8 and the load weight sensor Se9. The loading/towing detection unit 44 then estimates the increase in the travel resistance resulting from the load of a predetermined weight based on the aforementioned information, and the transition from the fuel economy drive mode as has been described to the rotating electric machine high efficiency drive mode is controlled in accordance with the increase in the travel resistance.

The drive control for the hybrid drive system H according to the third embodiment will be described referring to FIG. 12.

The flowchart shown in FIG. 12 includes the drive control (right flow) in the state where the travel resistance against the vehicle in the loading state is smaller than a predetermined value, and the drive control (left flow) in the state where the travel resistance is equal to or greater than the predetermined value.

Referring to the flowchart, the drive control unit 40 allows the load detection unit 51 to detect the presence/absence of the load, and the load weight (in steps #30, 31) such that the control is separated depending on the presence/absence of the load. If the load weight is smaller than the predetermined value (no in step #32), the fuel economy drive control is executed in accordance with the shifting map shown in FIG. 5 (step #34). That is, the fuel economy drive control unit 41 is normally activated without executing the load limit control.

Meanwhile, if the load weight is equal to or greater than the predetermined value (yes in step #32), the load limit control unit 43 immediately executes the load limit control, that is, the rotating electric machine high efficiency control according to the present invention (step #33). Under the rotating electric machine high efficiency control in this embodiment, a rotating electric machine high efficiency shifting map 42*d* (see FIG. 13) having the threshold value for executing the downshifting control (2-1 Down line) set at the lower drive force than in the shifting map shown in FIG. 5. Under the control, the shifting from the second shift speed to the first shift speed is performed at the earlier stage at the lower drive force, in comparison with the fuel economy drive control. This makes it possible to protect the rotating electric machine MG2 serving as the motor from the excessive load, thus avoiding the increase in the temperature of the rotating electric machine MG2.

Another Embodiment (1) In the first embodiment, the rotating electric machine high efficiency control includes three types of the process, that is, shift speed change control, engine operation point change control, and the rotating electric machine output limit control. One or two types of the aforementioned processes may be executed as the rotating electric machine high efficiency control for decreasing the limit start temperature in accordance with the presence/absence of a towed object or load, and the travel resistance. For example, in the case of the structure where the rotating electric machine output limit temperature (motor output limit temperature) is only set to execute the rotating electric machine output limit control, the rotating electric machine output limit temperature may be adjusted, that is, made lower in the presence of the towed object or the load, and kept unchanged in the absence of the towed object and the load. The rotating electric machine output limit temperature may be lowered in accordance with the increase in the travel resistance.

(2) In the above-described embodiments, basically, the control process for limiting the load of the rotating electric machine in comparison with the fuel economy control may be arbitrarily set so long as the load exerted to the rotating electric machine is reduced to be lower than the load under the fuel economy control. Considering the temperature of the rotating electric machine serving as the motor, a rotating electric machine efficiency mode may be established where the operation points of the engine and the rotating electric machine can be determined giving priority to the efficiency of the rotating electric machine, in reference to the map that has been prepared giving priority to the efficiency of the rotating electric machine.

The hybrid drive system is structured to execute the load limit control for limiting the load exerted to a rotating electric machine when the temperature of the rotating electric machine exceeds a predetermined temperature. If the travel resistance against the vehicle is increased resulting from its towing state, the temperature of the rotating electric machine serving as a motor may be maintained at a temperature equal to or lower than the tolerable temperature of the motor.

As should be appreciated, the loading state stands for the state where a vehicle such as a truck is loaded, in comparison with a vehicle with no load. The towing state stands for the state where a vehicle such as a trailer is towing a towed object, in comparison with a vehicle with no load.

The hybrid drive system operated in the fuel economy drive mode and another drive mode is capable of executing the load limit control for limiting the load exerted to the rotating electric machine. Under the load limit control, the load exerted to the rotating electric machine is limited, thus suppressing the temperature increase of the rotating electric machine.

According to an exemplary aspect of the invention, the load limit control is started when the temperature of the rotating electric machine exceeds the predetermined load limit start temperature. The controller changes/determines the load limit start temperature based on at least one of the loading state and the towing state detected. For example, if the vehicle in the towing state has the travel resistance larger than that of the vehicle not in the loading/towing state, the limit start temperature is set to be lower than the load limit temperature of the vehicle not in the loading/towing state. Furthermore, the limit start temperature for a large towing load is set to be further lower than the limit start temperature for a small towing load.

As described above, even if the heat generation limit temperature as the tolerable limit temperature of the rotating electric machine has been already determined, that is, the travel resistance of the vehicle increases as it tows a towed object to raise the temperature increase rate, the temperature of the rotating electric machine may be maintained under the heat generation limit temperature.

According to an exemplary aspect of the invention, the controller executes the load limit control for limiting the load exerted to the rotating electric machine in accordance with the detection result.

For example, if the towing state of the vehicle is detected by the controller, the load limit control is always executed. The hybrid drive system makes it possible to suppress the heat generation of the rotating electric machine if the vehicle is in the loading state or the towing state, thus preventing the temperature of the rotating electric machine from reaching the heat generation limit temperature.

Meanwhile, if the vehicle is not in the loading or towing state, the fuel economy drive mode is selected for traveling while giving priority to fuel consumption.

According to an exemplary aspect of the invention, the hybrid drive system that drives the vehicle both in the fuel economy drive mode and another drive mode is structured to execute the load limit control for limiting the load exerted to the rotating electric machine. Under the load limit control, the load exerted to the rotating electric machine is limited, thus suppressing the temperature increase of the rotating electric machine.

The load limit control is started when the temperature of the rotating electric machine exceeds the predetermined load limit start temperature. The controller changes and determines the load limit start temperature in accordance with the travel resistance against the vehicle. For example, if the travel resistance is larger than the reference value, the limit start temperature is set to be lower. Meanwhile if the travel resistance is smaller than the reference value, the limit start temperature is set to be higher.

When the heat generation limit temperature as the tolerable limit temperature of the rotating electric machine is determined, the travel resistance is increased accompanied with the towing of a towed object. The above structure makes it possible to maintain the temperature of the rotating electric machine below the heat generation limit temperature in spite of the increase in the temperature increase rate.

The load limit control may take various forms.
1. Decrease in the Shifting Threshold Value.

According to an exemplary aspect of the invention, the downshifting in the transmission is performed at the lower drive force side in the above-structured hybrid drive system. For example, in the case of downshifting from the second shift speed at the higher speed side to the first shift speed at the lower speed side, when the load limit control is executed, the shifting threshold value in the fuel economy drive mode where no load limit control is executed is set to the value at the lower drive force side.

When the travel resistance is increased, for example, when climbing the hill, the downshifting control is performed more quickly. This makes it possible to reduce the load exerted to the rotating electric machine at an earlier stage, thus maintaining the temperature of the rotating electric machine in good condition.

The aforementioned state will be described in more detail referring to the drawings.

In the fuel economy drive mode, the operation point of the engine is set to give priority to fuel economy, and insufficiency of the drive force from the engine is compensated by the rotating electric machine serving as the motor. FIG. 5 shows a shifting map of the transmission for shifting between a plurality of shift speeds. Referring to FIG. 5, the abscissa axis of the graph denotes the vehicle speed (Km/h), and the ordinate axis denotes the drive force (N). The drive force range covered by the first shift speed at the lower speed side is represented by the area below the thin solid line, and the drive force range covered by the second shift speed higher than the first shift speed is represented by the area below the bold solid line.

Referring to the graph, the bold dashed lines represent the drive forces derived from the engine at the first shift speed and the second shift speed, respectively upon the operation of the engine on the optimum fuel consumption line. Referring to the drawing, the upper bold dashed line denotes the engine drive force derived at the first shift speed (indicated as $1^{st}$ E/G drive force), and the lower bold dashed line denotes the engine drive force derived at the second shift speed (indicated as $2^{nd}$ E/G drive force). In the fuel economy drive mode, the engine generates the drive force on the line, and the insufficiency is covered by the rotating electric machine generating the drive force required by the respective shift speeds. FIG. 5 shows the drive force covered by the rotating electric machine serving as the motor in the drive state where the specific shift speed is selected as the "motor drive force."

The drawing shows that the engine drive force at the first shift speed is greater than the one at the second shift speed even in the state where the engine is operated on the optimum fuel consumption line. For example, at the operation point indicated by the black circle shown in the drawing, selection of the first shift speed causes the load borne by the rotating electric machine serving as the motor to be smaller compared with the case for selecting the second shift speed. The drive force covered by the rotating electric machine serving as the motor at the first shift speed is indicated by the "$1^{st}$ shift speed motor drive force," and the drive force covered by the rotating electric machine serving as the motor at the second shift speed is indicated by the "$2^{nd}$ shift speed motor drive force." At the operation point indicated by the black circle, the motor drive force becomes the "$2^{nd}$ shift speed motor drive force."

Referring to the drawing, the thin long dashed line shows the shifting threshold value upon upshifting from the first shift speed to the second shift speed indicated as the "1-2 UP line." The thin short line shows the shifting threshold value upon downshifting from the second shift speed to the first shift speed indicated as the "2-1 Down line." The use of the hysteresis for the shifting is intended to realize the smooth shifting without causing hunting.

Under the shifting control shown in the shifting map, when the vehicle is in the hill climbing after running at a higher speed, the operation point indicated by the black circle is positioned below the "2-1 Down line." In the aforementioned state, the shifting from the second shift speed to the first shift speed has not been performed.

Figure 13:
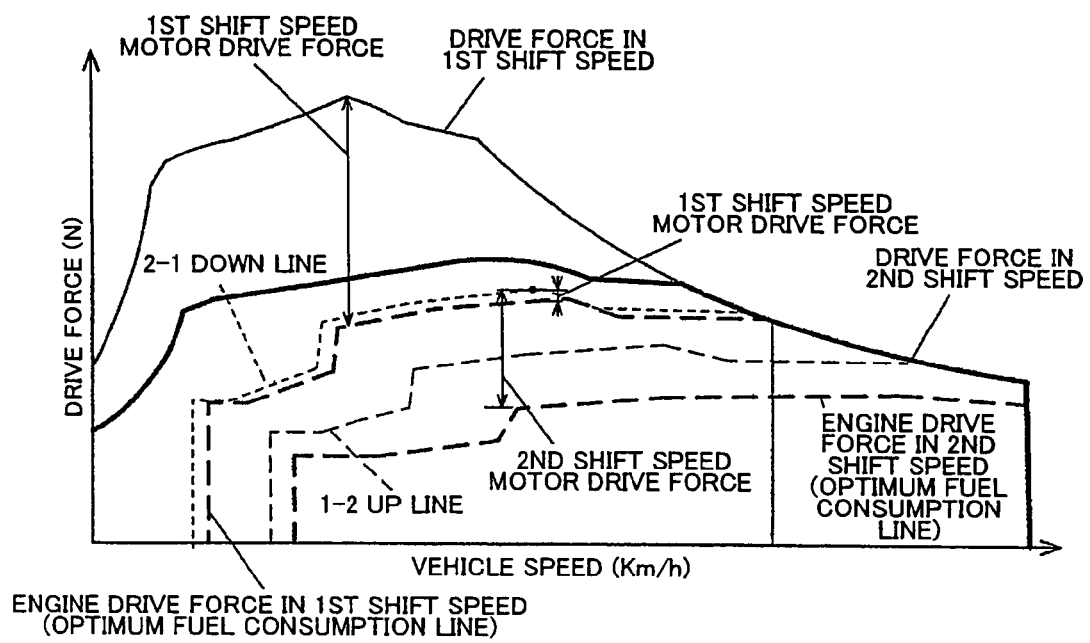
FIG. 13 is a view showing an exemplary structure of the shifting map employed in the third embodiment.
Figure 14:
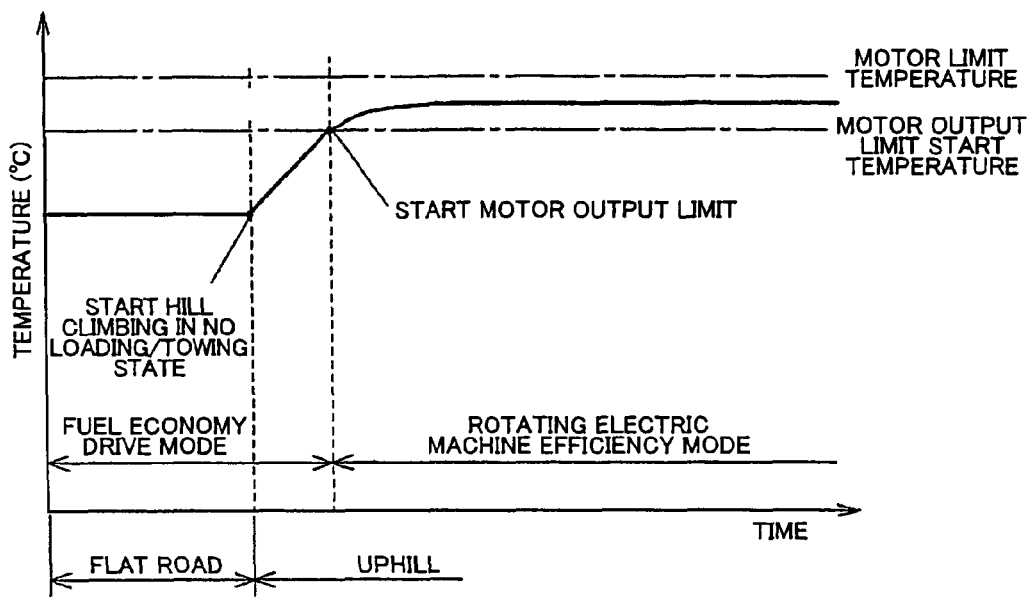
FIG. 14 is a view showing the motor temperature increase in the state where the vehicle is not in the towing state.
Figure 15:
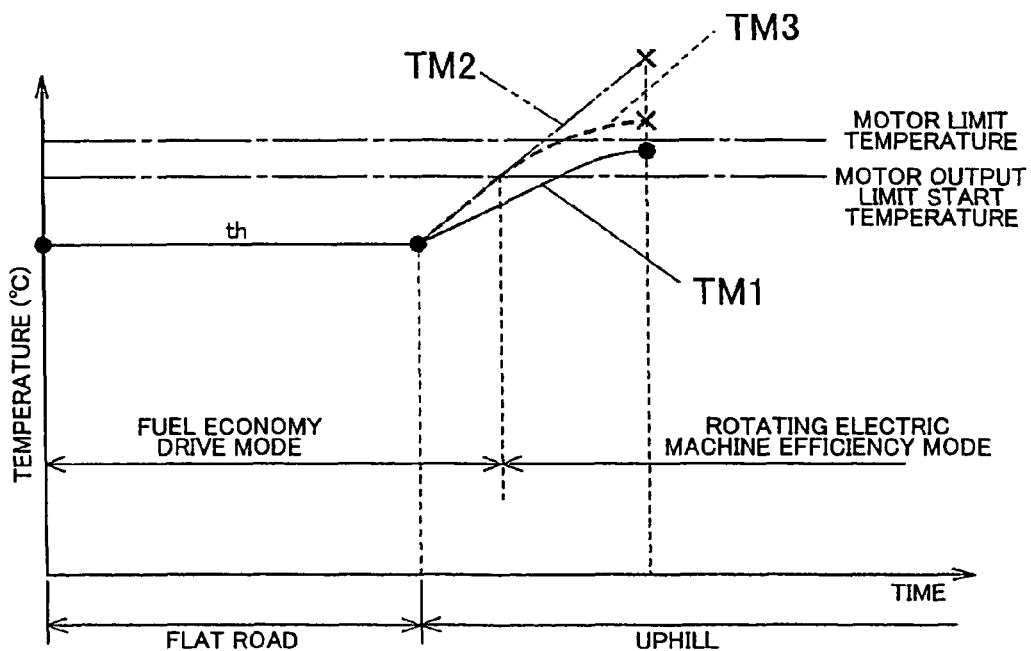
FIG. 15 is a view showing the motor temperature increase in the state where the vehicle is in the towing state.

Meanwhile, if the new shifting threshold value is set below the "2-1 Down line" as shown in FIG. 13, the downshifting may be performed at the earlier stage. This makes it possible to allow the engine to cover substantially all the drive force required at the travel point.

Accordingly, the load exerted to the rotating electric machine may be limited, thus suppressing the increase in the temperature of the rotating electric machine.
2. Shifting to the Lower Shift Speed As has been described, the shift speed may be directly brought to the lower side rather than simply setting the shifting threshold value to the lower side of the drive force.

According to an exemplary aspect of the invention, it is possible to increase the load borne by the engine, thus limiting or reducing the load exerted to the rotating electric machine.

The load limit control that has been described allows the load borne by the rotating electric machine to be reduced while maintaining the fuel economy drive mode as clearly shown in FIG. 5.
3. Change of the Engine Operation Point The control that changes the shift speed may be executed as described above. It may be structured as described in a sixth aspect of the present invention that an engine torque is increased to become higher than a torque in the fuel economy drive mode while maintaining an engine output constant.

In the structure, the engine operation point is deviated from the optimum fuel consumption line. However, the load borne by the rotating electric machine may be limited by directly increasing the engine torque, thus avoiding the increase in the temperature of the rotating electric machine.

4. Limitation of Rotating Electric Machine Output

According to an exemplary aspect of the invention, an output of the rotating electric machine required to be limited may be subjected to a limitation. In the aforementioned case, the increase in the temperature of the rotating electric machine may be avoided.

5. Application Order of Different Load Limit Control Processes

In the aforementioned structure, it is preferable to specify the order of applying the load limit control processes as below in the case of performing such operation as selection of the shift speed, the increase in the engine torque, or the limitation of the rotating electric machine output.

According to an exemplary aspect of the invention, when the temperature of the rotating electric machine further increases, an output of the rotating electric machine is limited, or an engine torque is increased to become higher than a torque in the fuel economy drive mode while maintaining an engine output constant.

The hybrid drive system according to the present invention executes the load limit control while driving the vehicle in the fuel economy drive mode when the temperature of the rotating electric machine is increased accompanied with the increase in the travel resistance.

The hybrid drive system with the transmission that realizes a plurality of the shift speeds allows the vehicle to travel while limiting the load exerted to the rotating electric machine in the fuel economy drive mode, by shifting the current shift speed to the lower shift speed. The aforementioned state is the same as the shifting state from the second shift speed to the first shift speed as described referring to FIG. 5. It is therefore preferably to perform the aforementioned process first.

If the temperature increase is still observed, either of the other two processes may be employed. When the engine torque increases while maintaining its output, the load borne by the rotating electric machine may be smoothly transferred to the engine irrespective of the state under the load limit control. This makes it possible to appropriately prevent the shock even under the load limit control.

Meanwhile, if the output of the rotating electric machine is directly limited, it reliably prevents the increase in the temperature of the rotating electric machine.

6. Rotating Electric Machine Efficiency Mode

According to an exemplary aspect of the invention, it possible to suppress the heat generation in the rotating electric machine, thus achieving the object of the present invention.

As has been described with respect to the processes under the load limit control, the detection process of the loading/towing state will be described hereinafter.

1. Loading State

According to an exemplary aspect of the invention, the controller detects a presence/absence of the load, and the weight of the load. The controller is allowed to lower the output limit start temperature and to limit the load exerted to the rotating electric machine upon confirmation of the travel resistance resulting from the loading state in comparison with that of the vehicle not in the loading/towing state.

2. Towing State

When the travel resistance that increases owing to the towing of a towed object is detected, preferably, the controller detects a presence/absence of a towed object to be towed by the vehicle, and detects a travel resistance against the vehicle in a travel state. Preferably the controller detects the towing state based on the presence/absence of the towed object detected and the travel resistance detected.

In the aforementioned structure, the controller detects the presence/absence of a towed object. Meanwhile, the controller is further provided to detect the travel resistance in the towing state. The controller is allowed to lower the output limit start temperature or to limit the load exerted to the rotating electric machine in accordance with the increase in the travel resistance recognized in comparison with that of the vehicle not in the loading/towing state.

When a traction vehicle equipped with the hybrid drive system according to the present invention is operated to tow a trailer or the like with no power source, the controller detects whether the trailer is linked to the traction vehicle, and which kind of trailer is towed may be employed.

3. Detection of Loading/Towing State from the Acceleration State

In the aforementioned structure, the loading state and the towing state are detected by the use of the controller. However, the loading state or the towing state may be detected based on the acceleration of the vehicle.

Such structure is proposed referring to the following example.

According to an exemplary aspect of the invention, the travel resistance against the vehicle that is not in the loading/towing state and that travels on the flat road is preliminarily obtained so as to be compared with the actual travel resistance of the vehicle on the flat road. This makes it possible to detect the loading state or the towing state of the vehicle based on the travel resistance.

The travel resistance may be detected based on the relationship between the drive torque for driving and the acceleration generated by the drive torque in the travel state on the flat road.

The travel resistance against the vehicle in the travel state may be detected. The controller obtains an accelerator opening degree and an acceleration of the vehicle. The travel resistance against the vehicle in the travel state may be obtained based on the accelerator opening degree detected and the acceleration of the vehicle detected.

What is claimed is:

1. A hybrid drive system comprising:
   an engine;
   at least one rotating electric machine, wherein the engine and the at least one rotating electric machine are capable of driving a vehicle; and
   a controller that:
      starts a load limit control that limits a load exerted to the rotating electric machine when a temperature of the rotating electric machine exceeds a load limit start temperature;
      detects a loading state or a towing state of the vehicle; and
      changes the load limit start temperature based on the loading state or the towing state detected.

2. The hybrid drive system according to claim 1, further comprising:
   a transmission that receives a drive force from the engine and the rotating electric machine, and performs shifting through a plurality of shift speeds to transmit the drive force to a wheel, wherein:
      when the controller executes the load limit control, a shifting threshold value for downshifting in the transmission is set to a value where the drive force is lower than that of a shifting threshold value for a downshifting in a fuel economy drive mode where no load limit control is executed.

3. The hybrid drive system according to claim 1, further comprising:
a transmission that receives a drive force from the engine and the rotating electric machine, and performs shifting through a plurality of shift speeds to transmit the drive force to a wheel, wherein:
when the controller executes the load limit control, a shift speed of the transmission is set to be lower than a shift speed selected in a fuel economy drive mode where no load limit control is executed.

4. The hybrid drive system according to claim 1, wherein when the controller executes the load limit control, an engine torque is increased to become higher than a torque in a fuel economy drive mode while maintaining an engine output constant.

5. The hybrid drive system according to claim 1, wherein when the controller executes the load limit control, an output of the rotating electric machine is limited.

6. The hybrid drive system according to claim 1, further comprising:
a transmission that receives a drive force from the engine and the rotating electric machine and performs shifting through a plurality of shift speeds to transmit the drive force to a wheel, wherein:
when the controller executes the load limit control, a shift speed of the transmission is set to be lower than a shift speed selected in a fuel economy drive mode where no load limit control is executed; and
when the temperature of the rotating electric machine further increases, an output of the rotating electric machine is limited, or an engine torque is increased to become higher than a torque in the fuel economy drive mode while maintaining an engine output constant.

7. The hybrid drive system according to claim 1, wherein when the controller executes the load limit control, a. rotating electric machine efficiency mode where operation points of the engine and the rotating electric machine are determined is selected while giving priority to efficiency of the rotating electric machine.

8. The hybrid system according to claim 1, wherein the controller:
detects a presence/absence of a load for the vehicle and a weight of the load, and
detects the loading state based on a detection result.

9. The hybrid drive system according to claim 1, wherein the controller:
detects a presence/absence of a towed object to be towed by the vehicle,
detects a travel resistance against the vehicle in a travel state, and
detects the towing state based on the presence/absence of the towed object detected and the travel resistance detected.

10. The hybrid drive system according to claim 1, wherein the controller:
detects whether the vehicle is traveling on a flat road,
detects a travel resistance against the vehicle in a travel state, and
detects the loading state or the towing state based on a relationship between an actual travel resistance detected and a flat road travel resistance of the vehicle not in a loading/towing state, in a state where the controller detects a travel state of the vehicle on the flat road.

11. The hybrid drive system according to claim 9, wherein the controller:
detects an accelerator opening degree and an acceleration of the vehicle, wherein:
a travel resistance against the vehicle in the travel state is obtained based on the accelerator opening degree detected and the acceleration of the vehicle detected.

12. A hybrid drive system comprising:
an engine;
at least one rotating electric machine, wherein the engine and the at least one rotating electric machine are capable of driving a vehicle; and
a controller that:
starts a load limit control that limits a load exerted to the rotating electric machine when a temperature of the rotating electric machine exceeds a load limit start temperature;
detects a travel resistance against the vehicle in a travel state; and
changes the load limit start temperature based on the travel resistance detected.

13. The hybrid drive system according to claim 12, further comprising:
a transmission that receives a drive force from the engine and the rotating electric machine, and performs shifting through a plurality of shift speeds to transmit the drive force to a wheel, wherein:
when the controller executes the load limit control, a shifting threshold value for downshifting in the transmission is set to a side where the drive force is lower than that of a shifting threshold value for a downshifting in a fuel economy drive mode where no load limit control is executed.

14. The hybrid drive system according to claim 12, further comprising:
a transmission that receives a drive force from the engine and the rotating electric machine, and performs shifting through a plurality of shift speeds to transmit the drive force to a wheel, wherein:
when the controller executes the load limit control, a shift speed of the transmission is set to be lower than a shift speed selected in a fuel economy drive mode where no load limit control is executed.

15. The hybrid drive system according to claim 12, wherein when the controller executes the load limit control, an engine torque is increased to become higher than a torque in a fuel economy drive mode while maintaining an engine output constant.

16. The hybrid drive system according to claim 12, wherein when the controller executes the load limit control, an output of the rotating electric machine is limited.

17. The hybrid drive system according to claim 12, further comprising:
a transmission that receives a drive force from the engine and the rotating electric machine and performs shifting through a plurality of shift speeds to transmit the drive force to a wheel, wherein:
when the controller executes the load limit control, a shift speed of the transmission is set to be lower than a shift speed selected in a fuel economy drive mode where no load limit control is executed; and
when the temperature of the rotating electric machine further increases, an output of the rotating electric machine is limited, or an engine torque is increased to become higher than a torque in a fuel economy drive mode while maintaining an engine output constant.

18. The hybrid drive system according to claim 12, wherein when the controller executes the load limit control, a rotating electric machine efficiency mode where operation points of the engine and the rotating electric machine are determined is selected while giving priority to efficiency of the rotating electric machine.

19. The hybrid drive system according to claim 12, wherein the controller:
   detects an accelerator opening degree and an acceleration of the vehicle, wherein:
      the travel resistance against the vehicle in the travel state is obtained based on the accelerator opening degree detected and the acceleration of the vehicle detected.

20. A drive control method of a hybrid drive system with an engine and at least one rotating electric machine that are capable of driving a vehicle, comprising:
   detecting a loading state or a towing state of the vehicle upon starting a load limit control that limits a load exerted to the rotating electric machine when a temperature of the rotating electric machine exceeds a load limit start temperature; and
   changing the load limit start temperature based on the detected loading state or the detected towing state.

21. A drive control method of a hybrid drive system with an engine and at least one rotating electric machine that are capable of driving a vehicle, comprising:
   detecting a travel resistance against the vehicle in a travel state upon starting a load limit control that limits a load exerted to the rotating electric machine when a temperature of the rotating electric machine exceeds a load limit start temperature; and
   changing the load limit start temperature based on the detected travel resistance.

22. A hybrid drive system comprising:
   an engine;
   at least one rotating electric machine, wherein the engine and the at least one rotating electric machine are capable of driving a vehicle; and
   a controller that:
      starts a load limit control that limits a load exerted to the rotating electric machine when a temperature of the rotating electric machine exceeds a load limit start temperature;
      detects a loading state or a towing state of the vehicle, or a travel resistance against the vehicle in a travel state; and
      changes the load limit start temperature based on the loading state, the towing state, or the travel resistance detected.

23. The hybrid drive system according to claim 1, wherein the hybrid drive system is normally driven in a fuel economy drive mode.

* * * * *